United States Patent Office 3,183,604
Patented May 18, 1965

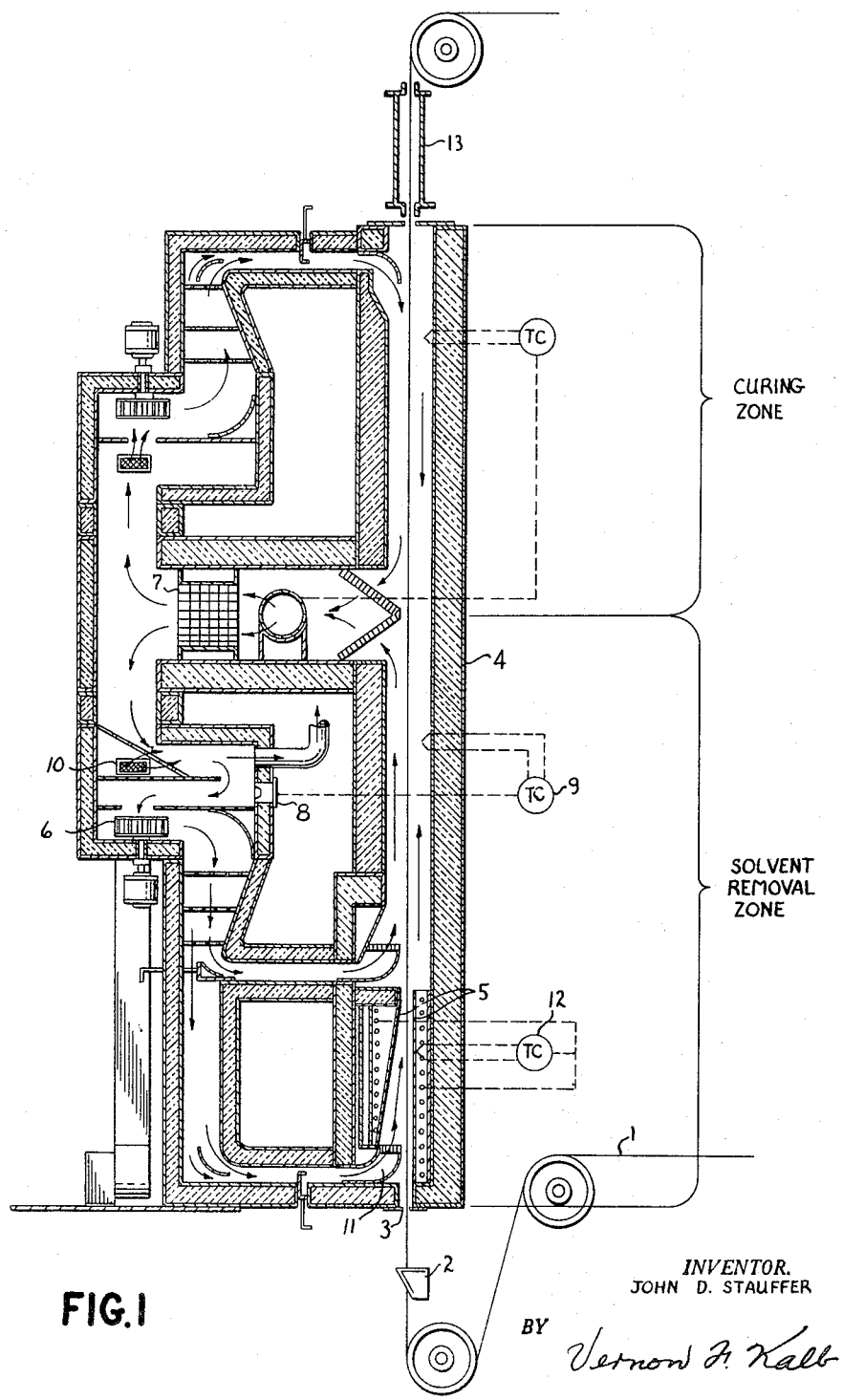

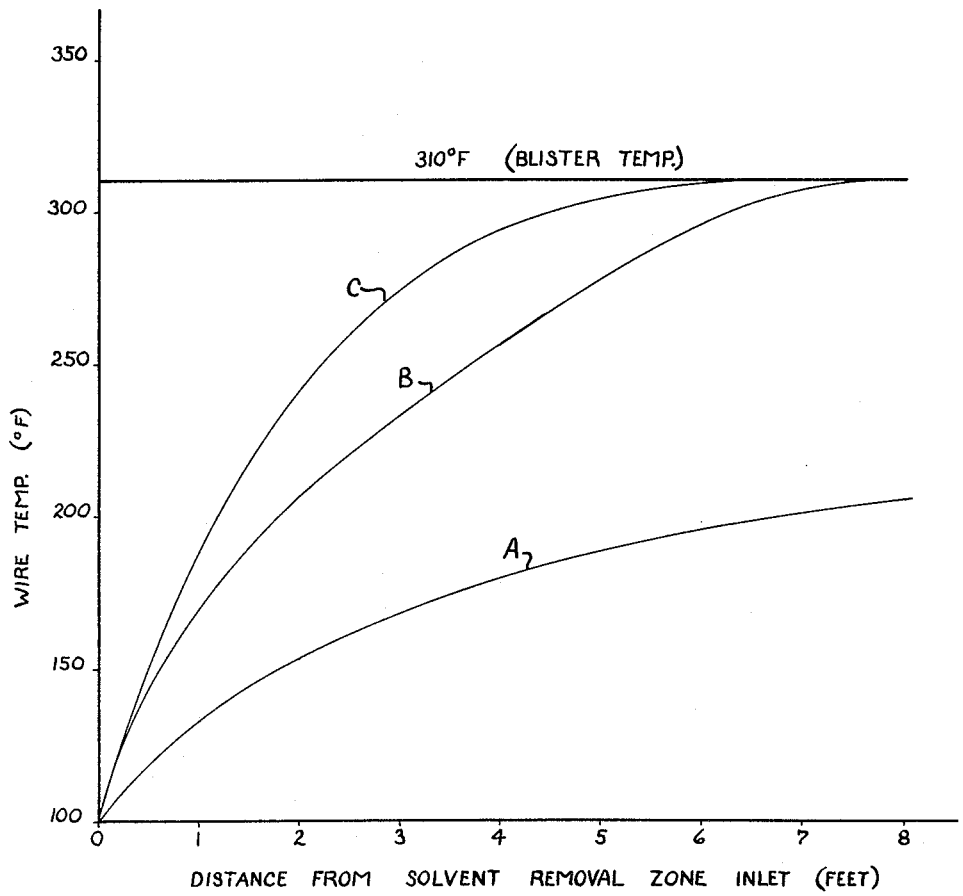

3,183,604
APPARATUS AND PROCESS FOR REMOVING
SOLVENTS FROM COATINGS ON METAL
John D. Stauffer, Shelbyville, Ind., assignor to General
Electric Company, a corporation of New York
Filed Dec. 27, 1961, Ser. No. 162,324
3 Claims. (Cl. 34—18)

This application is a continuation-in-part of application Serial No. 80,855, filed January 5, 1961, assigned to the same assignee as the present invention and now abandoned.

This invention relates to an apparatus and process for the heat treatment of coated metals and primarily to an apparatus and process for the evaporation of solvents and other volatile components contained in coating material as applied prior to the final curing or polymerization of the coating material. It has particular application to the curing of film coated enamel wire and has for its principal object the rapid evaporation of the solvent prior to the time that the curing of the surface layer of the coating has advanced to the point that is relatively impervious to the solvent.

In the apparatus and processes now commonly used to coat round and rectangular wires with enamels or resins, it is customary to suspend the coating material in a solvent or dispersing agent so the enamel may be applied evenly to the wire or foil surface. Before the enamel can be polymerized or "baked" to produce the desired electrical and mechanical properties, the dispersing agent or solvent must be removed. Since, as a practical matter, the enamel must be held at an elevated temperature for a period of time to remove these solvents, a portion of the overall length of any wire enameling oven must be devoted to their removal. It is, therefore, advantageous to provide for the heating of the coated wire so as to obtatin the maximum rate of solvent removal immediately upon the entry of the coated wire into the oven so that a greater portion of the total length of the oven may be used for the final curing of the enamel, or the wire may be passed through the oven at a greater rate of speed, thus providing an increase in capacity of the enameling oven.

In removing the solvents or dispersing agents rapidly from a solvent-resin mixture, several problems are encountered. If the solvents are heated rapidly to a temperature above their boiling point, the physical agitation caused by the boiling of the solvents will produce a rough surface on the enameled wire and render it unacceptable for use. Another problem, and usually the most severe, is the problem of so-called blistered wire. Such blistering occurs when the surface layer of the enamel coating is heated rapidly to a temperature where the polymerization of the resin proceeds more rapidly than does the removal of the solvent from the inner layers of the enamel. This results in a cured "skin" of enamel being formed on the outside of the coating, trapping the solvents remaining in the enamel. As soon as such entrapped solvents reach a temperature above their boiling point in the subsequent curing of the enamel, the accompanying vaporization of the solvent will produce a bubble in the enamel coating which may break, again causing the enamel coating to have poor dielectric strength so that it is generally unacceptable for electrical applications. My invention provides a solution to the above problems in apparatus for utilization in a process having a markedly greater solvent evaporation rate than has been possible in the past for producing enameled products of high quality.

In accordance with one aspect of my invention, I provide a method of and apparatus for heating the enamel-coated product, such as wire, immediately upon its entry into the curing oven by the simultaneous application of both radiant heating and convection heating produced by a heated air or gas stream which flows parallel to the axis of the wire. The combined heating action of these two heat sources quickly heats the enamel to a predetermined temperature which is determined by the polymerization rate of the enamel and the boiling point of its solvent. By the combination of such radiant and convection heating, I am able to increase the oven capacity per unit length by a ratio of 2:1 over that which is now prevalent in industry.

The features of novelty which characterize my invention are pointed out with particularity in the claims annexed to and forming a part of this specification. For a better understanding of the invention, however, its advantages and specific objects attained with its use, reference should be made to the accompanying drawing and following description in which I have described a preferred embodiment of the invention.

In the drawing, the FIG. 1 is a section view of an enameling furnace embodying my invention; and FIG. 2 is a graph showing the comparative benefits of my invention.

In examining the evaporation of a solvent from an enamel solvent mixture, it is known that, insofar as the rate of evaporation is concerned, it is desirable to heat the resin solvent mixture to the highest temperature possible so as to remove the solvent in the shortest period of time. Also it is desirable that any air passing over the uncured wire have the highest relative velocity possible, since the rate of solvent evaporation from the surface of the enamel is thus maximized and the fume concentration of the solvents in the oven air is reduced so as to minimize the risk of ignition. However, if the air temperature it as a level which for the specific enamel involved will result in a rapid polymerization of the surface layer of enamel, the surface layer will become realtively impervious to the solvent and will entrap the solvent remaining in the underlying layers of the enamel with the result that the enamel will blister. Moreover, while a high velocity is desirable for reducing the fume concentration in the oven and for increasing the rate of heating the enamel coating by convection, a high velocity may cause a turbulence of the air which will distort the film coating, causing a non-uniform film thickness.

Referring now specifically to FIG. 1, there is shown a wire enameling furnace which can be utilized in the practice of my invention. Bare copper wire 1 is passed through an enamel applicator 2 where a coating of resin and solvent in liquid form is applied. It then passes through an opening 3 in the bottom of the furnace oven 4 where it immediately is subjected to radiant heat produced by radiant heating panels 5, which, as shown, are disposed on both sides of the wire. A fan 6 produces a flow of air in the solvent removal zone having a path as indicated by the arrow shown on the drawing. This air may be heated by the catalytic burner 7 which burns the vapors released during the process. A separate burner 8 is also furnished to provide additional heat to the air delivered by fan 6, if required. The temperature to which the air being circulated is preheated prior to its passage through the solvent removal zone may be regulated in any suitable manner; for example, thermocouple 9, which is shown as being positioned downstream from the point where it is subjected to radiant heat produced by radiant panels 5 and adjacent the point of exit of wire 1 from the solvent removal zone, may provide a signal to cause additional heat to be applied to increase the temperature of the air or to provide for the admission of cool air through vent 10 to lower its temperature. It will be apparent that the air conduit 11 communicates with the solvent removal zone of the oven adjacent to the inlet 3 to assist in heating the wire enamel immediately upon the entry of wire 1 into the oven 4.

After the wire passes through the solvent removal zone, it passes upwardly through the curing zone of the furnace where the enamel is finally polymerized or baked prior to leaving the furnace and entering the cooler 13. It is apparent that the wire may make one or more additional passes through the wire enameling furnace or pass from the furnace as indicated by the arrow on the drawing.

In accordance with my invention, I provide a combination of heating means to heat each portion of the wire and enamel rapidly and simultaneously to the highest usable temperature for the solvent removal process immediately upon its entry into the oven. As shown in the drawing, I utilize radiant heating panels 5 to apply radiant heat to the wire 1 immediately upon its entry into the oven. I have found that the radiant heat panels 5 may have a temperature of the order of 1100° F.–1200° F., which is about four times the desired ultimate temperature of the enamel during the solvent removal process without causing a premature curing of the surface layer of the enamel. The use of radiant heat offers the further advantage of heating the enamel coating in depth, thereby reducing the temperature gradient in the coating to the order of 20° F. or less. Since the liquid diffusivity of the solvent (i.e., its ability to migrate to the surface of the enamel rises with increase in temperature, it is apparent that a minimum temperature gradient will aid in the removal of solvent.

The temperature of the preheated air, or gas, utilized during the solvent removal zone is determined by the maximum temperature at which the particular enamel utilized will not polymerize so rapidly as to produce a skin to entrap solvent in underlying layers. When the air temperature is at that level, it will in conjunction with the radiant heating panels heat the enamel to a temperature just under the temperature at which the enamel will blister while assuring the maximum rate of solvent removal since the total heat applied to the wire in the solvent removal zone is maximized.

It will be apparent that the "blister" temperature will vary according to the particular enamel used and this can easily be determined for any particular enamel. By way of illustration, if polyvinyl formal resin, as disclosed and claimed in U.S. Patent 2,307,588, Jackson et al., and Reissue Patent 20,430, Morrison et al., and frequently used for film-coated wire (known to the trade by the registered trademark "Formex") is used, the blister temperature of the enamel during the solvent removal process is about 310° F. Also, by way of illustration, if a polyester resin of the type disclosed and claimed in U.S. Patent 2,936,296, Precopio et al. (known to the trade by the registered trademark "Alkenex" is utilized, the blister temperature of the resin during the solvent removal process is about 370° F.

The maximum air temperature which may be utilized in the solvent removal zone to achieve the maximum rate of solvent removal without exceeding the blister temperature for the enamel involved will also vary in accordance with the air velocity, the wire speed, the wire size, the thickness of film applied during each pass through the furnace, and the amount of radiant heat applied to the enamel wire. By way of illustration, for Formex wire in which an enamel coating having a total build of 2.9 mils (i.e., increase in total diameter of the wire and coating) in six passes through the oven, or about 0.5 mil per pass is applied to a 40.3 mil round copper strand (No 18 A.W.G.), moving through the enameling oven at a speed of 86 feet per minute while being subjected to convention heating from air having a velocity of 500 feet per minute and with approximately 55% of the total heat applied to the coated wire being generated by the radiant heating panel, the air temperature may be of the order of 550° F without any blistering of the wire enamel.

For Formex wire in which an enamel coating having a total build of 3.1 mils in six passes is applied to a round copper strand having a diameter of 22.6 mils, moving through the enameling oven at a speed of 98 feet per minute while being subjected to convection heating by air having a velocity of 500 feet per minute, approximately 35% of the total heat applied in the solvent removal zone would normally be the result of radiant heating. The air temperature would be of the order of 500° F.

From the foregoing examples it is apparent that the ratio of radiant heating to convection heating utilized in the solvent removal zone will vary with a higher proportion of the total heat being the result of radiant heat when relatively large size copper wire is being enameled. It is important, therefore, that the proportion of heat applied by radiation and convection be independently controllable. This invention provides separate controls for the radiant and convection heat sources of solvent removal zone.

The graph of FIG. 2 indicates the improvement in performance obtained by the use of this invention. While the curves relate to a particular wire size and enamel applied under specific conditions, it provides a typical example of the benefits derived from the use of the invention.

Curves A, B, and C of FIGURE 2 each show the calculated temperature of a section of wire as it passes through the solvent removal zone. Each of these curves involves the use of identical parameters except as indicated below.

The curves are all based on the coating of a 20.1 mil diameter wire (No. 24 A.W.G.) with the polyvinyl formal resin described above. The build of enamel (i.e., the amount of increase in diameter of the wire plus the coating) in six passes through the enameling oven is assumed to be 2.2 mils. The solvent removal zone of the oven is assumed to be eight feet long. An air velocity of 500 feet per minute and an air temperature of 336° F. is assumed.

Curve A shows the calculated temperature of the wire where a wire speed of 98 feet per minute and no radiant heating is utilized. It will be noted that the wire temperature is about 155° F. at the end of the eight foot long solvent removal zone.

Curve B indicates the calculated temperature of the wire under identical conditions as curve A, except that wire speed is reduced 50% or is at the rate of 49 feet per minute.

Curve C indicates the calculated temperature of the wire under identical conditions as curve A, except that radiant heating panels four feet long, having an approximate operating temperature of 1100° F. and disposed as shown in FIG. 1 to provide simultaneous radiant and convection heating of the wire as it enters the oven. It will be noted that curve A indicates that the temperature of the wire as it leaves the influence of the radiant panel is about 295° F. or substantially at the blister temperature of the enamel (i.e., 310° F.). Thus the benefits derived from the use of this invention in increase of production rate and/or decrease in equipment size is readily apparent.

As an indication of the criticality of the maximum temperature of the surface layer of the enamel coating, the relative curing rates of the enamel used on Formex wire is as follows.

| Temperature, ° F. | Curing time, minutes |
|---|---|
| 310 | 60 |
| 390 | 2.75 |
| 460 | 0.10 |

It is therefore apparent that the blister temperature for any given enamel can be determined and should not be exceeded in the solvent removal zone.

As indicated above, it is desirable that a relatively high air velocity be utilized. I have found that if the air stream is caused to flow parallel to the axis of the wire with its coating of uncured enamel, the relative air velocity measured with respect to the wire may be as much as about 700 feet per minute without producing turbulence which will deform the coating on the wire. While this air velocity level can be achieved under laboratory conditions without causing turbulence, in practice, I find that the relative air velocity should not exceed about 500 feet per minute to accommodate variations found in production equipment and processes. This level assures a high rate of heating of the enamel coating by convection without causing a turbulence which will deform the film.

While I have described the preferred embodiment of my invention, it should be understood that modifications will occur to those skilled in the art. It should be understood, therefore, that in the appended claims I intend to cover all such modifications which do not depart from the spirit or scope of my invention.

What I claim as my invention is:

1. A process for the removal of a solvent from an enamel coating on a continuously moving strip of material comprising the application of radiant and convection heat to each portion of the strip simultaneously and immediately upon the initiation of the solvent removal process with the convection heat being provided by a preheated stream of gas flowing parallel to the path of the strip and in the direction of the strip movement and with the radiant heating being applied on opposite sides of said moving strip, and circulating said gas at a velocity that is greater than the velocity of the strip, the relative velocity of said gas with respect to said strip being not greater than 500 feet per minute.

2. A process for removing a solvent from a liquid enamel coating applied to a continuously moving wire comprising the simultaneous application of radiant and convection heat to each portion of the wire immediately upon the initiation of the solvent removal process and for a portion of the solvent removal process only with the radiant heating being applied on opposite sides of the moving wire, and the application of convection heat alone for the remainder of the solvent removal process, said convection heat being provided by a stream of gas flowing essentially parallel to the path of wire movement at a relative velocity with respect to the wire not greater than 500 feet per minute and said gas having a temperature in excess of the blister temperature of the enamel.

3. Apparatus for eliminating a solvent from a liquid enamel coating applied to a continuously moving wire comprising an elongated treating chamber for receiving the wire coated with a solvent-containing enamel, an entrance opening at one end of said chamber for the entry of said coated wire, gas duct means communicating with said treating chamber and having a gas discharge opening positioned adjacent the entrance opening of the treating chamber for delivering preheated gas thereto, fan means in said gas duct means for pumping the preheated gas through the treating chamber at a relative velocity with respect to said wire not greater than 500 feet per minute, said gas flowing past the coated wire having a temperature in excess of the blister temperature of the enamel, heater means for heating the gas prior to the discharge from said duct means, and radiant heating means positioned in said treating chamber on opposite sides thereof adjacent the entrance opening thereof for heating said coated wire immediately upon its entry into said treating chamber.

References Cited by the Examiner

UNITED STATES PATENTS

| | | | |
|---|---|---|---|
| 1,472,741 | 10/23 | Ayres | 34—155 |
| 1,722,797 | 7/29 | Jessup | 34—18 |
| 1,947,546 | 2/34 | Reading | 34—155 |
| 1,947,548 | 2/34 | Fruth | 34—18 |
| 2,186,032 | 1/40 | Mann | 34—18 |
| 2,534,973 | 12/50 | Ipsen | 34—159 |
| 2,542,064 | 2/51 | Tilden | 34—155 |
| 2,578,744 | 12/51 | Rusca | 34—18 |
| 2,743,529 | 5/56 | Hayes | 34—86 |

FOREIGN PATENTS 873,821  7/61  Great Britain.

PERCY L. PATRICK, *Primary Examiner.*
NORMAN YUDKOFF, *Examiner.*